United States Patent
Kalinin et al.

(10) Patent No.: US 10,810,022 B2
(45) Date of Patent: Oct. 20, 2020

(54) EXECUTABLE CONFIGURATION TEMPLATE LANGUAGE

(71) Applicant: Pivotal Software, Inc., San Francisco, CA (US)

(72) Inventors: Dmitriy Kalinin, San Francisco, CA (US); Nima Kaviani, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 16/279,811

(22) Filed: Feb. 19, 2019

(65) Prior Publication Data

US 2020/0264899 A1    Aug. 20, 2020

(51) Int. Cl.
  *G06F 9/44* (2018.01)
  *G06F 9/448* (2018.01)

(52) U.S. Cl.
  CPC .................. *G06F 9/4494* (2018.02)

(58) Field of Classification Search
  CPC .................................... G06F 9/4494
  See application file for complete search history.

(56) References Cited

U.S. PATENT DOCUMENTS

| | | | | |
|---|---|---|---|---|
| 7,000,213 B2 * | 2/2006 | Banerjee | ................. | G06F 8/445 716/103 |
| 9,372,670 B1 * | 6/2016 | Cartey | ................ | G06F 16/2237 |
| 2006/0161880 A1 * | 7/2006 | Saad | ........................ | G06F 8/20 717/104 |
| 2012/0266158 A1 * | 10/2012 | Spivak | .................. | G06F 9/5055 717/175 |
| 2013/0117326 A1 * | 5/2013 | De Smet | ............... | G06F 9/4488 707/798 |

OTHER PUBLICATIONS

Github.com [online], Tom's Obvious, Minimal Language,[retrieved on Apr. 12, 2019], retrieved from: https://github.com/toml-lang/toml, 13 pages.
Golang.org [online], The Go Programming Language, [retrieved on Apr. 12, 2019], retrieved from: https://golang.org/pkg/text/template/, 18 pages.

(Continued)

*Primary Examiner* — Hang Pan
(74) *Attorney, Agent, or Firm* — Fish & Richardson P.C.

(57) ABSTRACT

Methods, systems, and apparatus, including computer programs encoded on computer storage media, for generating configuration files using executable template language statements. One of the methods includes receiving a configuration template file for a structured configuration language that defines nodes, relationships between nodes, and, for each of one or more nodes, associates metadata with the node. A reserved character pattern is identified in the configuration template file attached to text that defines a node in the structured configuration language, wherein the reserved character pattern has one or more associated statements in an executable template language. A graph representation is generated that includes the node corresponding to the text. Statements in the executable template language associated with the reserved character pattern are executed to generate associated metadata for the node.

23 Claims, 6 Drawing Sheets

(56) References Cited

OTHER PUBLICATIONS

Wikipedia.com [online], "TOML," dated Mar. 4, 2019, [retrieved on Apr. 12, 2019], retrieved from: https://en.wikipedia.org/wiki/TOML, 2 pages.
Wikipedia.com [online], "YAML," dated Mar. 21, 2019, [retrieved on Apr. 12, 2019], retrieved from https://en.wikipedia.org/wiki/YAML, 12 pages.
Yaml.org [online], "YAML: YAML Ain't Markup Language," [retrieved on Apr. 12, 2019] retrieved from: https://yaml.org/, 3 pages.

* cited by examiner

EXECUTABLE CONFIGURATION TEMPLATE LANGUAGE

BACKGROUND

This specification relates to structured configuration languages.

A configuration language is a set of protocols for using text to associate arbitrary metadata with named entities. A configuration file is thus a file containing text of a particular configuration language. For brevity, in this specification, a named entity associated with metadata in a configuration language will be referred to as a key-value pair. However, the key of a key-value pair need not be unique, and the value can include one or more elements of information.

The named entities commonly represent software and hardware entities, and the metadata in a configuration file can be used to configure such entities. For example, a configuration file can be used to define respective names of virtual machines in a cluster of virtual machines in a datacenter.

A structured configuration language is any appropriate configuration language that can be used to specify data structures as values, e.g., lists, arrays, and maps, as well as nesting between the data structures. For example, a value for a particular key can be a list, and an element of the list can be another list, and so on. Commonly used structured configuration languages include Yet Another Markup Language (YAML), Tom's Obvious Markup Language (TOML), JavaScript Object Notation (JSON), and initialization file format (INI files), to name just a few examples.

Structured configuration languages provide users with the ability to record very detailed configurations of intricate real-world systems. For example, a platform orchestrator can use detailed configuration files to launch software platforms. In this specification, a platform orchestrator is a software system that provisions resources for and configures the components of a software platform, which for brevity may be referred to as the platform orchestrator launching the software platform. One example of a platform orchestrator is Pivotal Container Service (PKS). PKS provides developers with an interface that allows them to set up and configure a Kubernetes cluster, which is an example of a cloud software platform. A Kubernetes cluster is a container orchestrator that manages the execution of workloads in containers. Each software task in a Kubernetes cluster can be referred to as a pod, and each pod can have one or more containers that each execute the task. A Kubernetes cluster generally includes a master node and one or more worker nodes that can execute workloads in containers and ensure that the workloads continue stateful execution even in the presence of software or hardware failures. Thus, a developer can issue a handful of command-line commands to PKS, and PKS can provide the functionality of automatically provisioning resources for and configuring the nodes of a Kubernetes cluster that executes on the underlying cloud computing platform.

However, the intricacy provided by structured configuration languages naturally increases the likelihood of bugs and other errors. In addition, generating a configuration file for a complicated system can require significant manual effort that is tedious and highly error-prone.

Templating tools exist that seek to partially automate creation of configuration files. Templating tools operate by manipulating the text of a configuration template. However, this process is also very error prone because it requires significant manual input to make sure that the text generated by a templating tool is correct for the particular structured configuration language. For example, templating tools can generate values for a particular node in a configuration template, but it is still up to the user to ensure that indenting is correct, character escape sequences are correct, and quotations for strings are correct.

SUMMARY

An executable template language that can be embedded within structured configuration template files.

Particular embodiments of the subject matter described in this specification can be implemented to realize one or more of the following advantages. The executable template language statements described in this specification can be used improve the process of generating configuration files. Particular aspects of the configuration file generation process can be automated, which includes error checking functionality. The techniques described in this specification allow the highly error-prone tasks of managing indenting, escape sequences, and string quotations to be pushed to an automatic serializer for the structured configuration language.

The executable template language statements can be made completely transparent to parsers for the structured configuration language. This means that users do not have to learn an entirely new language or install entirely new tools for a new language. Rather, the input and the output of the process are valid files in the structured configuration language and can be treated as such by existing tools for the language. The techniques described in this specification provide users with the ability to combine, reuse, and customize structures without repetition, which allows users to better organize and manage their configurations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Figure 3A:
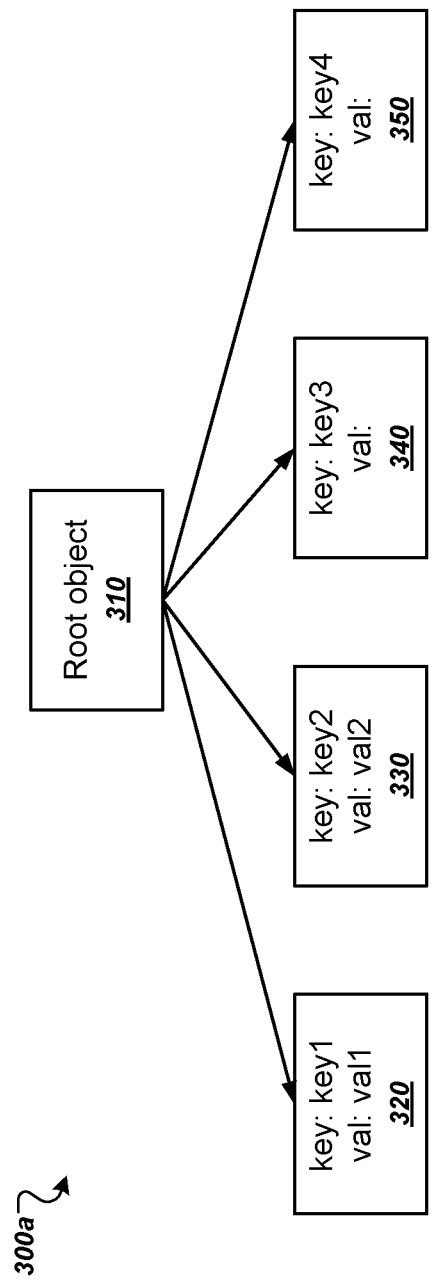
FIG. 3A illustrates an initial graph representation of the example in TABLE 1.
Figure 3B:
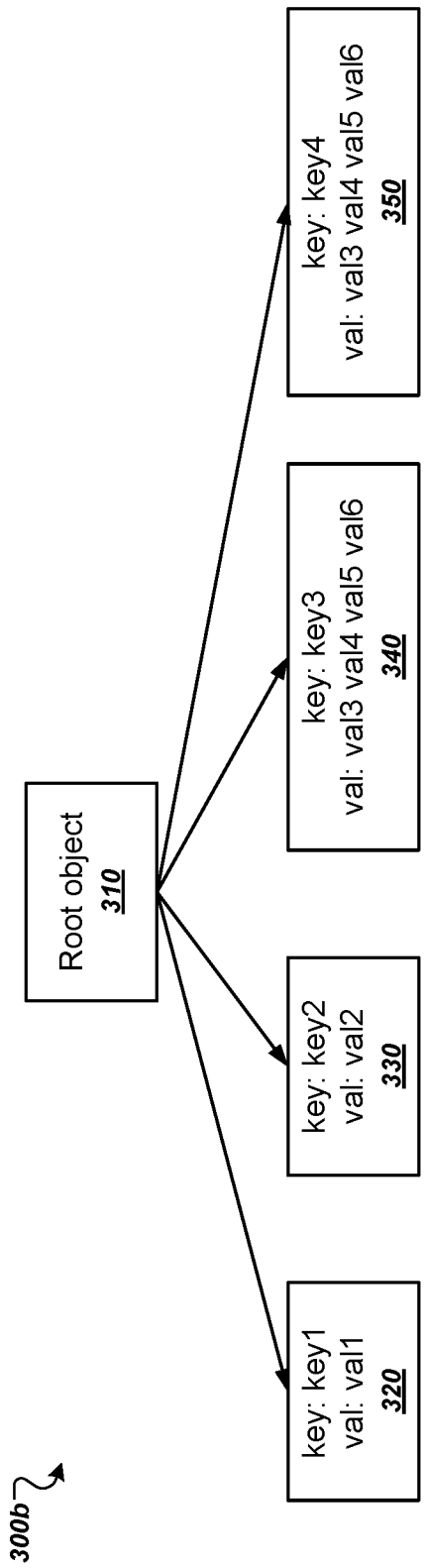
FIG. 3B illustrates a modified graph representation of the example in TABLE 1.
Figure 3C:
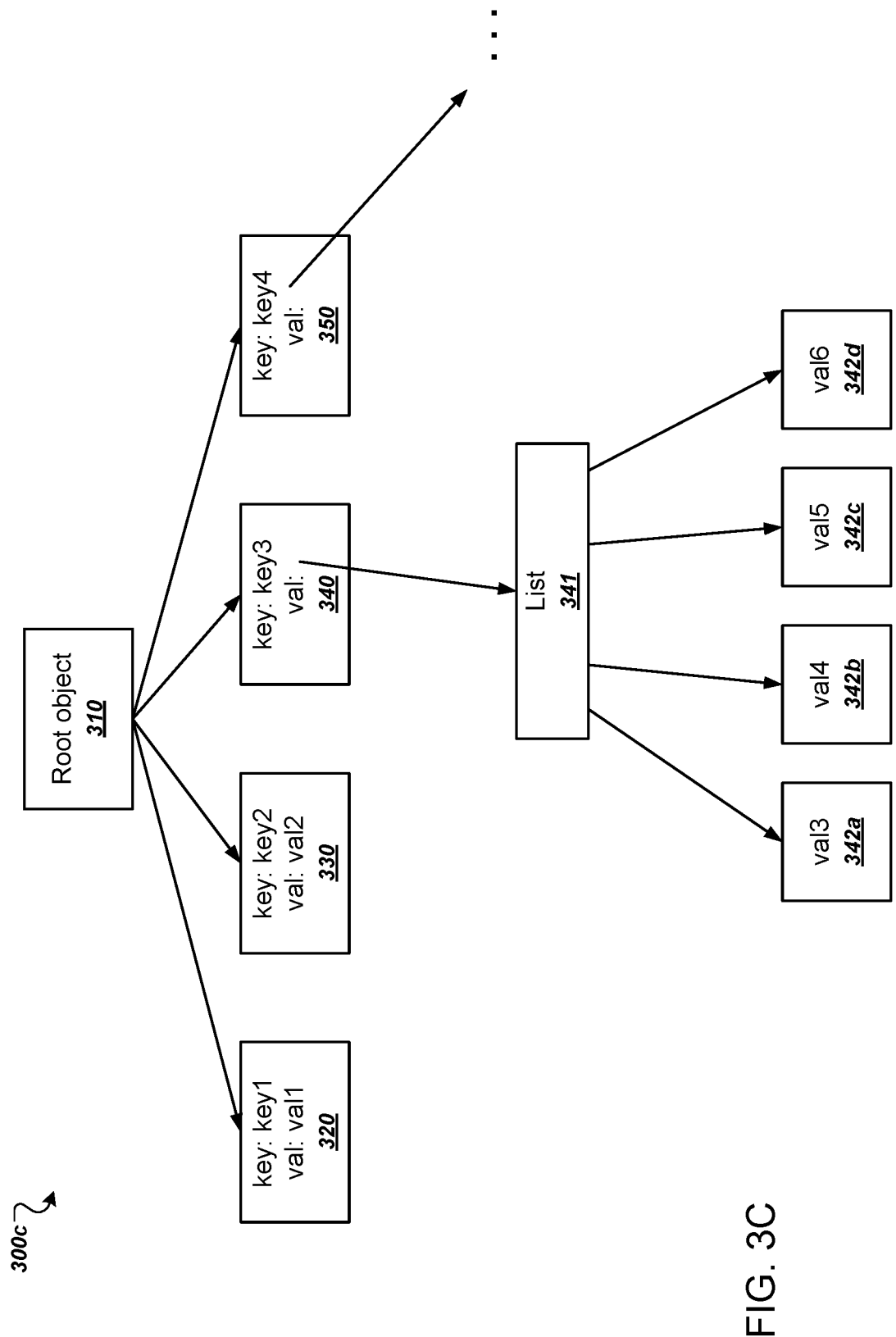
FIG. 3C illustrates a modified graph representation of the example in TABLE 2.
Figure 3D:
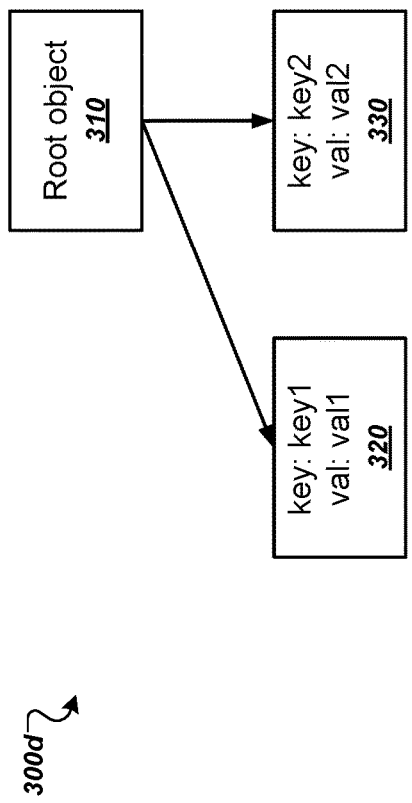
Figure 3E:
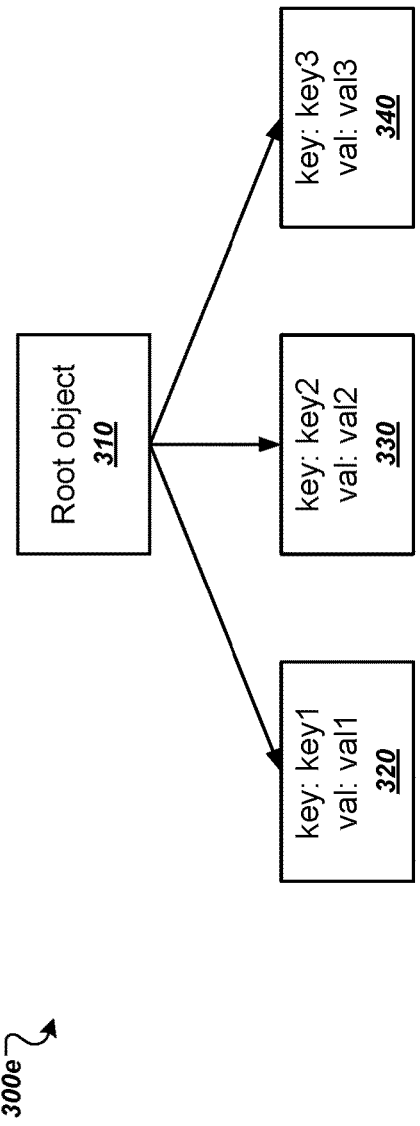

FIGS. 3D-E illustrate the different possibilities of a conditional node generation command.

Like reference numbers and designations in the various drawings indicate like elements.

DETAILED DESCRIPTION

Figure 1:
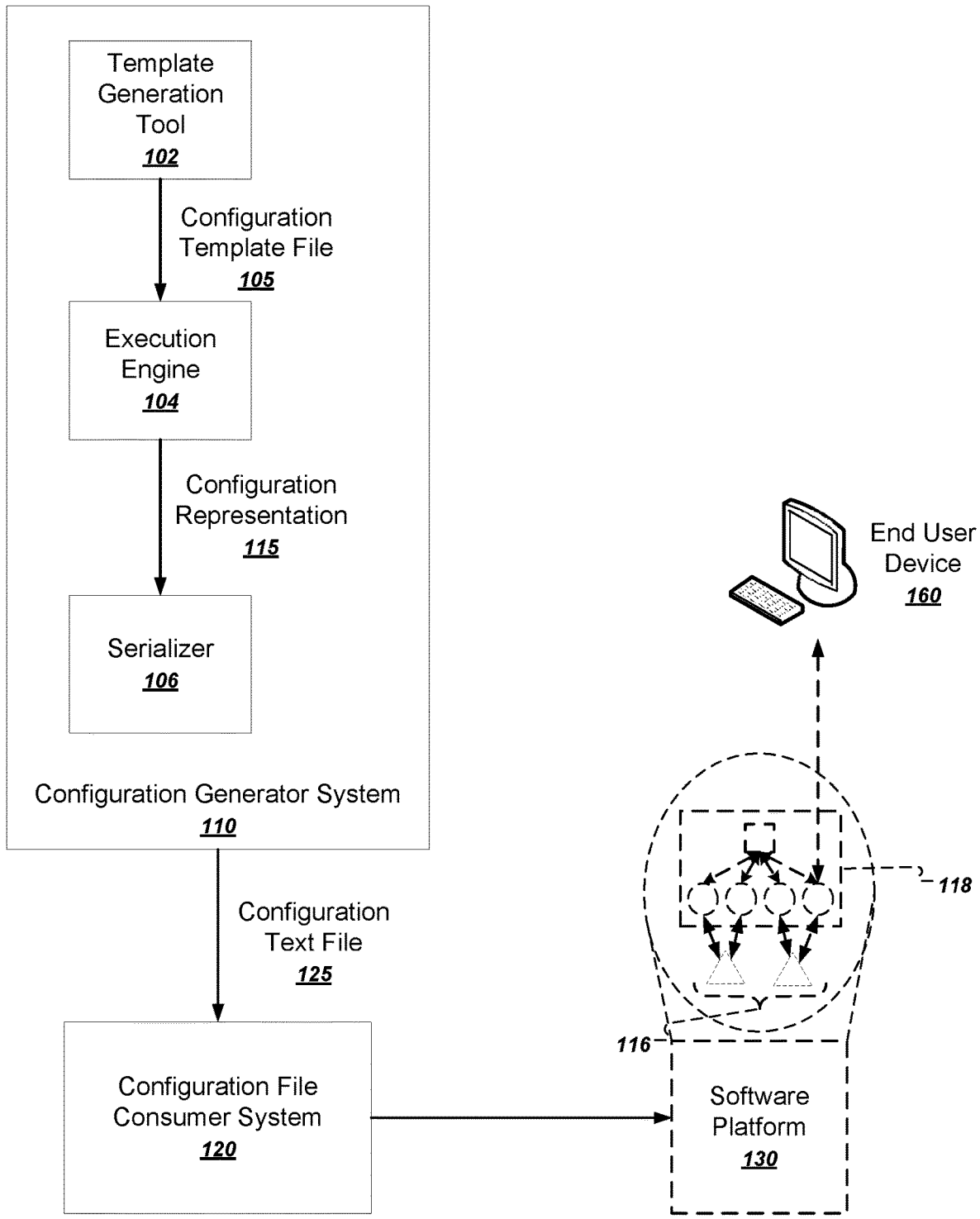
FIG. 1 illustrates an example system.

FIG. 1 illustrates an example system 100 for generating configuration files using an executable template language. The system 100 is an example of a system in which the techniques described in this specification can be implemented.

The system 100 includes a configuration generator system 110 and a configuration file consumer system 120. In general, the configuration generator system 110 processes a configuration template file 105 to generate a configuration text file 125 for consumption by the configuration file consumer system 120.

The configuration file consumer system 120 can be any appropriate computer system that uses configuration files to configure software or hardware systems. As one example, the configuration file consumer system 120 can be a platform orchestrator that optionally launches one or more software platforms 130. In this example, the software platform 130 is illustrated as having a cluster of nodes 118 that execute workloads on the platform. The cluster 118 can for example be a Kubernetes cluster, and the configuration file consumer system 120 can be part of a platform orchestrator that launches Kubernetes clusters. After being launched, end user devices 160 can access workloads executing on the software platform 130 launched by the platform orchestrator 120.

The configuration generator system 110 can be any appropriate computer system having one or more computers in one or more locations that can execute software for generating configuration text files 125. In some implementations, the configuration generator system 110 is a personal computer, e.g., a desktop or laptop computer.

The configuration generator system 110 has a template generation tool 102. The template generation tool 102 can be any appropriate tool capable of editing text files. In some implementations, the template generation tool 102 has syntax highlighting capabilities that parse in-progress configuration template files to aid the user in generating them.

The configuration generator system 110 also includes an execution engine 104. The execution engine 104 can process configuration template files 105 written by users of the system 110. In particular, the execution engine 104 can parse a configuration template file 105 in order to execute statements written in an executable template language embedded within the configuration template file 105.

The executable template language can be implemented so as to be completely transparent to template generation tools. Therefore, for example, the template generation tool 102 need not have any awareness of or ability to process statements written in the executable template language. In other words, a user can use the template generation tool to write statements in the executable template language in a way that will be ignored by the syntax highlighting capabilities of the template generation tool 120. For example, the statements in the executable template language can always be attached to comments in the structured configuration language. This transparency is described in more detail below.

Figure 2:
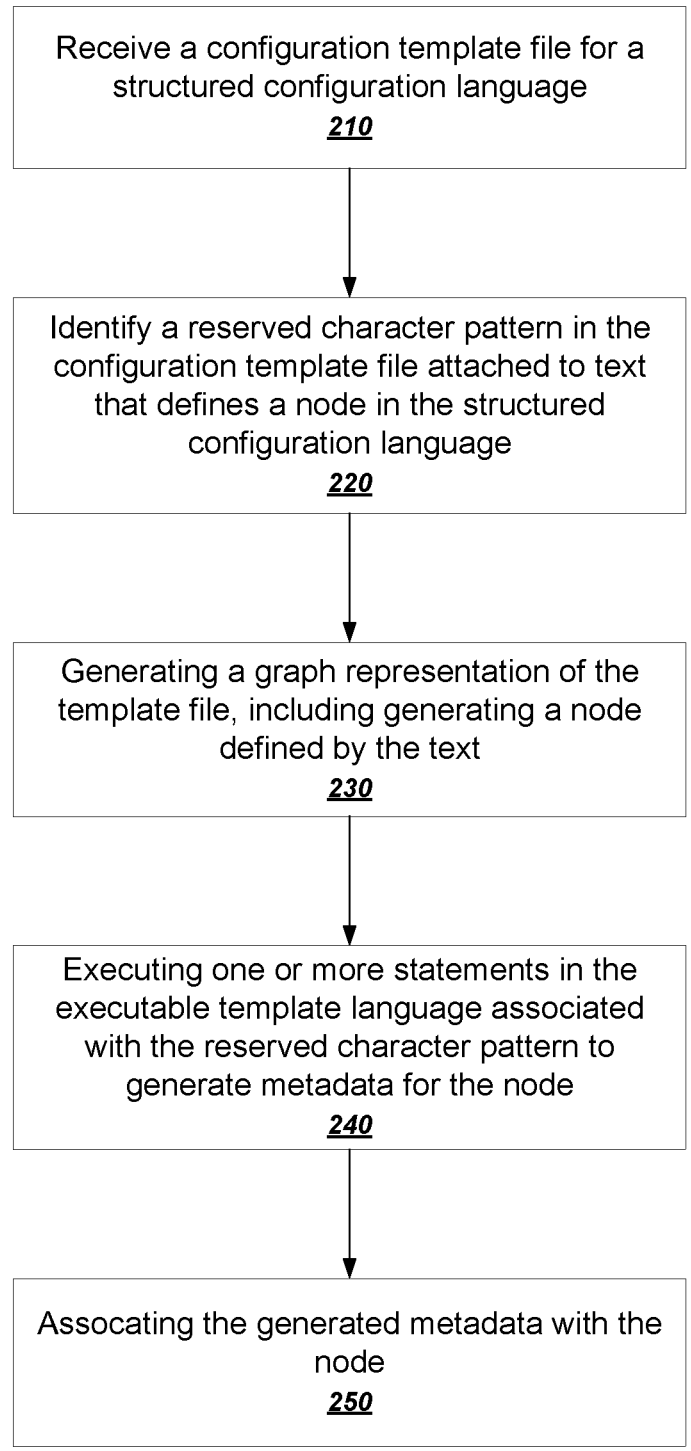
FIG. 2 is a flowchart of an example process for processing statements written in an executable template language.

FIG. 2 is a flowchart of an example process for processing statements written in an executable template language. The example process will be described as being performed by a system of one or more computers. The example process can be performed by any appropriate system of one or more computers programmed in accordance with this specification. For example, the example process can be performed by the execution engine 104 describe above with reference to FIG. 1.

The system receives a configuration template file for a structured configuration language (210). The configuration template file can originate from any appropriate source. For example, the configuration template file can be manually entered by a user using a template generation tool. Alternatively or in addition, the configuration template file can be obtained from a remote location, e.g., downloaded over the Internet or an intranet.

The configuration template file being in a structured configuration language means that the configuration template file defines a plurality of nodes and one or more relationships between the nodes. The configuration template file can also associate metadata with one or more of the nodes.

The system identifies a reserved character pattern in the configuration template file attached to text that defines a node in the structured configuration language (220). The reserved character pattern is a pattern of one or more characters that indicates the presence of one or more statements in the executable template language.

As described above, the statements in the executable template language can be completely transparent to tools that are programmed to process the syntax of the structured configuration language. For example, the reserved character pattern can begin with one or more comment characters in the structured configuration language. For example, if the comment character is #, the reserved character pattern can be #@ followed by one or more statements. Because # is the comment character, tools that understand the structured configuration language can ignore all statements in the executable template language.

In this specification, a executable statement with a reserved character pattern being attached to a text that defines a node means that the reserved character pattern applies to the immediately following node definition in the configuration template file. In other words, the statements apply to the following node and not to the following line, which may contain whitespace or comments.

The system generates a graph representation including generating a node corresponding to the text (230). In other words, the system uses the structure of the structured configuration language in the configuration template file to generate a graph representation having one or more nodes as defined in the structured configuration language.

The graph representation includes information that defines the relationships between nodes according to the structure of the configuration template file. For example, the graph representation can indicate that one node is a parent node of another node.

The system executes one or more statements in the executable template language associated with the reserved character pattern to generate metadata for the node (240) and associates the generated metadata with the node (250).

The following example in TABLE 1 is an example configuration template file having executable template language statements:

TABLE 1

| | |
|---|---|
| 1 | --- |
| 2 | #@ def multiple_values( ): |
| 3 | "val3 val4 val5 val6" |
| 4 | #@ end |
| 5 | --- |
| 6 | key1: val1 |
| 7 | key2: val2 |
| 8 | key3: #@ multiple_values( ) |
| 9 | key4: #@ multiple_values( ) |

In this example structured configuration language, a configuration template file can define one or more root objects, each root object being a map of key-value pairs. In this example, the structured configuration language has a document delimiter of three dashes, "---" which can be used to define multiple documents in a single character stream. These delimiters can be used to separate executable statements from other portions of the configuration file. Nevertheless, the system can apply the executable statements defined anywhere in the configuration template file to any portion of the text of the configuration template file. In some implementations, a system implementing executable template language statements generates a graph representation only for the last root object defined. In other words, the system can be configured to assume that other document delimiters are used to separate executable statements from the configuration file statements.

Thus, in this example, the last root object is defined by the document delimiter on line 5.

On line 6, a first key, key1, is mapped to a first value, val1. Similarly, on line 7, key2 is mapped to val2.

Line 2 contains a reserved character pattern that indicates the start of an executable statement. In this case, the reserved character pattern is "#@". The first character of the reserved character pattern corresponds to a comment character in the structured configuration language. Therefore, from the perspective of a parser for the structured configuration language, the executable statement on line 2 does not define anything that needs to be added to the graph representation of the configuration file.

The statement on line 2 defines a function named "multiple_values" that returns a string of four values: "val3 val4 val5 val6".

The reserved character pattern and accompanying executable statement on line 4 defines the end of the function "multiple_values".

Line 8 has a key, key3, that is mapped to a function call of "multiple_values". The function call is denoted by the reserved character pattern. Thus, for a parser of the structured configuration language, key3 has an empty value.

Line 9 has a key, key4, that is also mapped to a function call of "multiple_values". This example illustrates the usefulness of defining functions in the executable template language. If the string of values should change, a developer needs to only change the definition of multiple_values rather than changing potentially hundreds of occurrences of those values in a final configuration file.

FIG. 3A illustrates an initial graph representation 300a of the example in TABLE 1. The initial graph representation 300a includes a root object 310, which is a map node with four children, nodes 320, 330, 340, and 350, corresponding respectively to lines 6, 7, 8, and 9 of TABLE 1.

The initial graph representation 300a is an example of the interpretation that would be given by a conventional consumer of configuration files in the structured configuration language. Notably, in the initial graph representation 300a, nodes 340 and 350 have empty values. This is because the values on lines 6 and 7 of the configuration template file are commented out by the reserved character pattern.

FIG. 3B illustrates a modified graph representation 300b of the example in TABLE 1. The modified graph representation 300b illustrates the structure of the program after the executable statements are executed. In particular, the nodes 340 and 350 now have non-empty values as a result of executing the "multiple_values" function.

In practice, a system need not first generate an initial graph representation before executing the executable statements. Rather, the system can generate a single graph representation and execute the executable statements inline while building the graph representation. In some implementations, the system generates internal function calls for each node defined in a configuration template file, with each internal function call having a unique identifier for each respective node. The function calls are then processed by the execution engine to insert nodes into their appropriate locations in the graph representation.

TABLE 2 illustrates a modification to the example in TABLE 1. In particular, instead of a string, the function "multiple_values" now returns a list.

TABLE 2

| 1 | #@ def multiple_values( ): |
| 2 | - val3 |
| 3 | - val4 |
| 4 | - val5 |
| 5 | - val6 |
| 6 | #@ end |
| 7 | --- |
| 8 | key1: val1 |
| 9 | key2: val2 |
| 10 | key3: #@ multiple_values( ) |
| 11 | key4: #@ multiple_values( ) |

Lines 1-6 of the example configuration template file in TABLE 2 define a list of values rather than a single string. Because these lines are embedded in a function definition of an executable statement, the initial graph representation of the example in TABLE 2 would be identical to the graph representation of TABLE 1 illustrated in FIG. 3A. As described above, in some implementations the system generates a graph representation only for nodes defined below the last document delimiter, which in this example is on line 7.

Although the initial graph representation would be the same as the graph representation for TABLE 1, the modified graph representation after executing the executable statements would be different. FIG. 3C illustrates a modified graph representation 300c of the example in TABLE 2.

As shown, the node 340 now has a value that is a list node 341. The list node 341 itself has four children nodes, 342a, 342b, 342c, and 342d, each of which includes a value as defined by the function "multiple_values." The node 350 would have similar child nodes as the node 340, but for illustrative clarity, these nodes have been omitted from FIG. 3C.

TABLE 3 illustrates conditional node generation functionality of the executable template language.

TABLE 3

| 1 | key1: val1 |
| 2 | key2: val2 |
| 3 | #@ nodeif test( ): |
| 4 | key3: val3 |

In particular, on line 3 is a reserved character pattern followed by a keyword that specifies conditional node generation. In the executable template language, the keyword is "nodeif," although other keywords could also be used, e.g., "if/end". The conditional node generation command, when executed, generates a node in the graph structure if the subsequent condition is true. In this case, the condition is a function call to a function named "test," which is defined elsewhere in the executable template language, e.g., in a user-defined library. If "test" returns true, a node is added to the graph representation. Otherwise, no node is added. In this example, the conditional node generation command attaches to the next node defined in the file rather than just the next line in the file. Thus, if the next node in the file defined a complicated structure, e.g., a nested map, the nested map would be included or not included in its entirety based on the outcome of the "test" function.

FIGS. 3D-E illustrate the different possibilities of a conditional node generation command. In FIG. 3D, the graph representation 300d is the result when "test" returns false. In FIG. 3E, the graph representation 300e is the result when "test" returns true.

These examples illustrate that the statements of the executable template language directly modify the in-memory graph representation of the configuration template file. In other words, the executable template language is not just generating and appending strings within a text file. Rather, the actual structure represented in structured configuration language is being modified. This distinction in functionality over prior configuration templating approaches is important because it provides much more power for error checking, character escaping, and file validation. This means that once the system identifies a node, the system can apply some logic to it, e.g., looping in a for loop, looping in a while loop, and defining new nodes, to name just a few examples.

The power of this functionality allows development of libraries of functions in the executable template language for entire problem domains. For example, if the configuration template file is being used to generate a configuration file for a platform orchestrator to launch a software platform, developers can write libraries for verifying particular aspects of the configuration template file that are specific to the software platform. This enables powerful error-checking capabilities that can catch errors at the configuration file generation state rather than at the much more expensive software platform launching stage, which might incur actual platform expenses as resources are actually provisioned to launch the platform.

For example, the software platform itself may impose restrictions on the names of computing nodes executing on the platform, e.g., a maximum character length. A developer could then write a library function in the executable template language to perform error checking on that restriction.

TABLE 4 illustrates additional advanced functionality of the executable template language in this problem space.

TABLE 4

```
1    nodes:
2    #@ num_nodes_a = 3
3    #@ num_nodes_b = 5
4
5    #@ def is_odd(n):
6    #@    return n % 2 != 0
7    #@ end
8
9    #@ if not is_odd(num_nodes_a):
10   #@    fail("number of nodes a must be odd")
11   #@ end
12
13   #@ if not is_odd(num_nodes_b):
14   #@    fail("number of nodes b must be odd")
15   #@ end
16
17   #@ if num_nodes_a > num_nodes_b:
18   #@    fail("number of nodes a must be greater than number
19   of nodes b")
20   #@ end
21
22   #@ for/end i in range(0, num_nodes_a):
23   - #@ "node_a_"+str(i+1)
24
25   #@ for/end i in range(0, num_nodes_b):
26   - #@ "node_b_"+str(i+1)
```

The example configuration template file shown in TABLE 4 includes a number of executable statements that when executed results in a configuration file that defines three computing nodes of type a and five computing nodes of type b. In this example, the occurrence of the term "node" should be understood to mean a computing node to be launched in a software platform rather than a node of the internal structure of the configuration file.

On lines 2-3, the configuration template file has statements that define two variables that respectively define the number of nodes of type a and type b. These variables can be referenced by other executable statements that occur in the configuration file.

On node 5, the configuration template file defines a function "is_odd" that tests whether or not its argument is odd.

On line 9, the configuration template file defines a error check that tests whether or not the number of nodes of type a is odd. This error check raises an error with the "fail" function if the number of nodes of type a is not odd. Similarly, on line 13, the configuration template file defines an error check that raises an error if the number of nodes of type b is not odd.

On line 13, the configuration template file defines a further error check that raises an error if the number of nodes of type a is not greater than the number of nodes b.

These error checks on lines 9, 13, and 17, encode some external knowledge of the software platform directly in the configuration file itself. Attempts to generate a configuration file that has an even number of nodes will thus fail at configuration file generation time. Furthermore, the reasons for the failure will be readily apparent to a user trying to generate the configuration file both because of the code of the checks themselves as well as the error messages encoded directly in the configuration template file.

On line 22, the configuration template file has a "for/end" node loop command. The node loop command iterates over one or more nodes. In this example, the node loop command generates nodes according to the iterator i. In this example, i iterates through integers 0 to the value of the variable num_nodes_a defined on line 2.

Similarly, on line 25, the configurate template file has another node loop command that iterates over integers from 0 to the value of the variable num_nodes_b defined on line 3.

After generating the graph representation and associating the metadata generated by the executable statements with nodes in the graph, the system can use a serializer for the structured configuration language to generate a text file that conforms to the standards of the language. The serializer thus handles all of the character escaping and quotation wrapping that is required for a correct output and without requiring manual input from the user. In other words, by modifying the graph structure directly, the system saves the user from having to reason about such tedious and error-prone tasks.

TABLE 5 illustrates an example configuration file output after executing a serializer on the graph generated by the executable statements in TABLE 4.

TABLE 5

```
1    nodes:
2    - node_a_1
3    - node_a_2
4    - node_a_3
5    - node_b_1
6    - node_b_2
7    - node_b_3
8    - node_b_4
9    - node_b_5
```

Notably, both the configuration file output and the original configuration template file are both valid in the structured configuration language. This means that both files can be parsed by a parser for the structured configuration language without encountering syntax errors. This in contrast to conventional templating approaches, in which the special characters that denote template commands are not always valid in the structural configuration language.

TABLE 6 illustrates an alternative syntax for error checking that takes the form of an annotation. In other words, the user can annotate lines in the configuration file with annotation-style error checks that perform the same functionality as the if/end blocks explained above with reference to table 4.

TABLE 6

| | |
|---|---|
| 1 | #@validation/check self > 10 |
| 2 | key1: 10 |
| 3 | |
| 4 | #@validation/check self > num_nodes( ) |
| 5 | key2: 10 |

On line 1, a "validation/check" is an annotation name, and "self>10" is an annotation value. The system can interpret this syntax as an error check on the value of the key to which it is attached. In this example, the annotation would result in a check that the value of "key" was greater than 10. In this example, the value is not greater than 10, and therefore, the system can generate an error. The example on line 5 is similar, except that the value to be checked is dynamically generated by the function call to the function "num_nodes", which illustrates that the values in the annotation checks can be dynamically generated and need not be hard coded.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
receiving a configuration template file for a structured configuration language that defines nodes, relationships between nodes, and, for each of one or more nodes, associates metadata with the node;
identifying a reserved character pattern in the configuration template file attached to text that defines a node in the structured configuration language, wherein the reserved character pattern has one or more associated statements in an executable template language;
generating a graph representation including generating the node corresponding to the text;
executing one or more statements in the executable template language associated with the reserved character pattern to generate metadata for the node; and
associating the generated metadata with the node.

Embodiment 2 is the method of embodiment 1, wherein the reserved character pattern causes the executable statements to be ignored by parsers of the structured configuration language.

Embodiment 3 is the method of embodiment 2, wherein the reserved character pattern begins with a comment character in the structured configuration language.

Embodiment 4 is the method of any one of embodiments 1-3, wherein the configuration template file is a valid file in the structured configuration language.

Embodiment 5 is the method of embodiment 4, wherein values in the configuration template file that are defined by executable statements result in empty values when the configuration template file is read by a parser for the structured configuration language.

Embodiment 6 is the method of any one of embodiments 1-5, further comprising:
invoking a serializer for the structured configuration language on the graph representation having the generated metadata to generate a configuration file output.

Embodiment 7 is the method of any one of embodiments 1-6, wherein the one or more statements in the executable template language comprise a function definition and a function call that calls the function definition.

Embodiment 8 is the method of embodiment 7, further comprising executing the function call to generate one or more additional nodes in the graph representation.

Embodiment 9 is the method of any one of embodiments 1-8, wherein the one or more statements in the executable template language comprise a conditional node generation command that generates a node in the graph representation if and only if a condition is true.

Embodiment 10 is the method of any one of embodiments 1-9, wherein the one or more statements in the executable template language comprise a node loop command that iterates over one or more nodes in the graph representation.

Embodiment 11 is the method of any one of embodiments 1-10, wherein the one or more statements in the executable template language comprise an annotation check that imposes a condition on a value of a next configuration file node.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
receiving a configuration template file for a structured configuration language that defines nodes, relationships between nodes, and, for each of one or more nodes, associates metadata with the node;
identifying a reserved character pattern in the configuration template file attached to text that defines a node in the structured configuration language, wherein the reserved character pattern has one or more associated statements in an executable template language;
generating a graph representation including generating the node corresponding to the text;
executing one or more statements in the executable template language associated with the reserved character pattern including executing a function call in the executable template language attached to the text, the function call referencing a function definition within the configuration template file expressed in the executable template language to generate metadata for the node; and
associating the generated metadata with the node.

2. The method of claim 1, wherein the reserved character pattern causes the executable statements to be ignored by parsers of the structured configuration language.

3. The method of claim 2, wherein the reserved character pattern begins with a comment character in the structured configuration language.

4. The method of claim 1, wherein the configuration template file is a valid file in the structured configuration language.

5. The method of claim 4, wherein values in the configuration template file that are defined by executable statements result in empty values when the configuration template file is read by a parser for the structured configuration language.

6. The method of claim 1, further comprising:
invoking a serializer for the structured configuration language on the graph representation having the generated metadata to generate a configuration file output.

7. The method of claim 1, further comprising executing the function call to generate one or more additional nodes in the graph representation.

8. The method of claim 1, wherein the one or more statements in the executable template language comprise a conditional node generation command that generates a node in the graph representation if and only if a condition is true.

9. The method of claim 1, wherein the one or more statements in the executable template language comprise a node loop command that iterates over one or more nodes in the graph representation.

10. The method of claim 1, wherein the one or more statements in the executable template language comprise an annotation check that imposes a condition on a value of a next configuration file node.

11. A system comprising:
one or more computers and one or more storage devices storing instructions that are operable, when executed by the one or more computers, to cause the one or more computers to perform operations comprising:
receiving a configuration template file for a structured configuration language that defines nodes, relationships between nodes, and, for each of one or more nodes, associates metadata with the node;
identifying a reserved character pattern in the configuration template file attached to text that defines a node in the structured configuration language, wherein the reserved character pattern has one or more associated statements in an executable template language;
generating a graph representation including generating the node corresponding to the text;
executing one or more statements in the executable template language associated with the reserved character pattern including executing a function call in the executable template language attached to the text, the function call referencing a function definition within the configuration template file expressed in the executable template language to generate metadata for the node; and
associating the generated metadata with the node.

12. The system of claim 11, wherein the reserved character pattern causes the executable statements to be ignored by parsers of the structured configuration language.

13. The system of claim 12, wherein the reserved character pattern begins with a comment character in the structured configuration language.

14. The system of claim 11, wherein the configuration template file is a valid file in the structured configuration language.

15. The system of claim 14, wherein values in the configuration template file that are defined by executable statements result in empty values when the configuration template file is read by a parser for the structured configuration language.

16. The system of claim 11, wherein the operations further comprise:
invoking a serializer for the structured configuration language on the graph representation having the generated metadata to generate a configuration file output.

17. The system of claim 11, wherein the operations further comprise executing the function call to generate one or more additional nodes in the graph representation.

18. The system of claim 11, wherein the one or more statements in the executable template language comprise a conditional node generation command that generates a node in the graph representation if and only if a condition is true.

19. The system of claim 11, wherein the one or more statements in the executable template language comprise a node loop command that iterates over one or more nodes in the graph representation.

20. The system of claim 11, wherein the one or more statements in the executable template language comprise an annotation check that imposes a condition on a value of a next configuration file node.

21. One or more non-transitory computer storage media encoded with computer program instructions that when executed by one or more computers cause the one or more computers to perform operations comprising:
receiving a configuration template file for a structured configuration language that defines nodes, relationships between nodes, and, for each of one or more nodes, associates metadata with the node;
identifying a reserved character pattern in the configuration template file attached to text that defines a node in the structured configuration language, wherein the reserved character pattern has one or more associated statements in an executable template language;
generating a graph representation including generating the node corresponding to the text;
executing one or more statements in the executable template language associated with the reserved character pattern including executing a function call in the executable template language attached to the text, the function call referencing a function definition within the configuration template file expressed in the executable template language to generate metadata for the node; and associating the generated metadata with the node.

22. The computer storage media of claim 21, wherein the configuration template file is a valid file in the structured configuration language.

23. The computer storage media of claim 22, wherein values in the configuration template file that are defined by executable statements result in empty values when the configuration template file is read by a parser for the structured configuration language.

* * * * *